Feb. 8, 1966 J. C. BOWEN ETAL 3,233,863
VALVE HAVING MULTIPLE SEATING SURFACES
Filed April 15, 1963

INVENTORS
JOHN C. BOWEN
ROBERT C. WOLF
BY
ATTORNEY

United States Patent Office 3,233,863
Patented Feb. 8, 1966

3,233,863
VALVE HAVING MULTIPLE SEATING SURFACES
John C. Bowen, Davisville, and Robert C. Wolf, Hatboro, Pa., assignors to Pressure Products Industries, Inc., Hatboro, Pa., a corporation of Pennsylvania
Filed Apr. 15, 1963, Ser. No. 273,092
3 Claims. (Cl. 251—210)

This invention relates to valves and more particularly to valves for use with fluids at high pressure.

Difficulties have been encountered with many valves heretofore proposed when used with high pressures up to about 30,000 p.s.i. These difficulties have arisen in part because the constructions employed had a plurality of concentricities to be matched.

It is the principal object of the present invention to provide a valve for fluids at high pressure which is simple in construction, involves a minimum of machine operations in its construction and which has simple but effective seating provisions.

It is a further object of the present invention to provide a valve for fluids at high pressure in which an inserted valve seating sleeve is utilized, the open end of which provides access to the valve stem.

It is a further object of the present invention to provide a valve for fluids at high pressure which can have a single or multiple seating portions as desired.

It is a further object of the present invention to provide a valve for fluids at high pressure having a metal to metal seat with an additional resilient seat if desired.

Other objects and advantageous features of the invention will be apparent from the description and claims.

Figure 1:
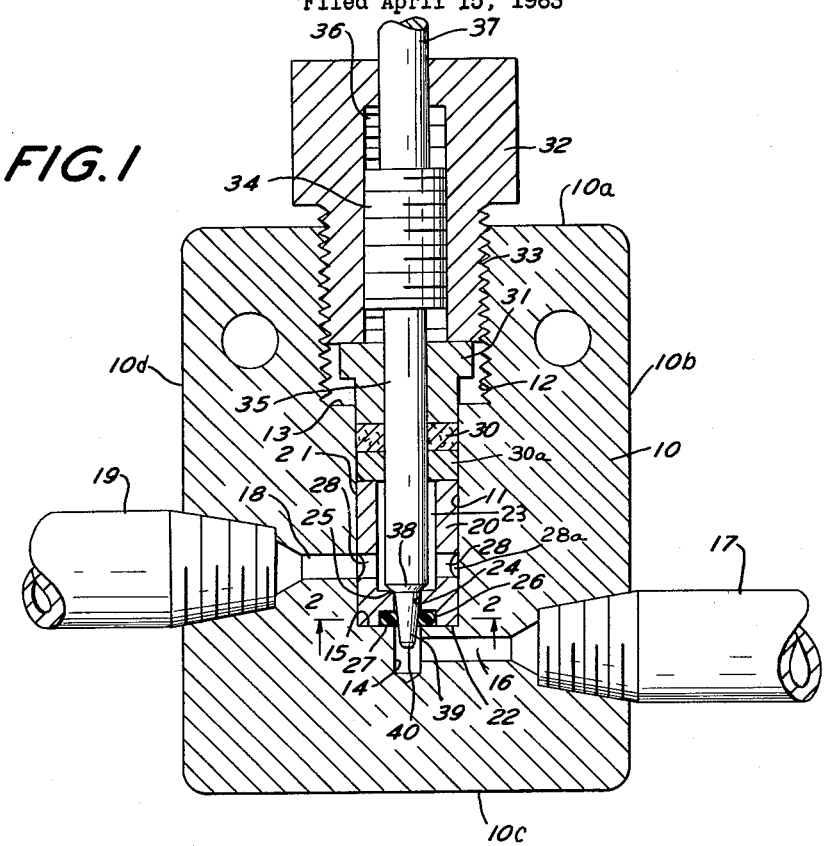
Figure 2:
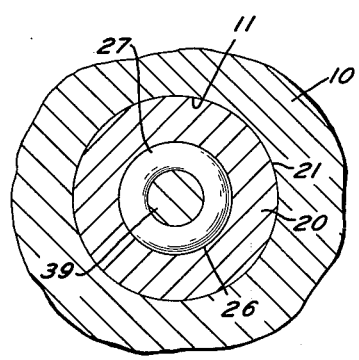

The nature and characteristic features of the invention will be more readily understood from the following description taken in connection with the accompanying drawings forming part thereof, in which:

FIGURE 1 is a vertical or longitudinal central sectional view of a preferred form of valve in accordance with the invention; and FIG. 2 is a horizontal or transverse sectional view, enlarged, taken approximately on the line 2—2 of FIG. 1.

It should, of course, be understood that the description and drawings herein are illustrative merely, and that various modifications and changes can be made in the structure disclosed without departing from the spirit of the invention.

Referring now more particularly to the drawings in which a preferred embodiment of the invention is illustrated, a metallic body 10 is provided with bounding faces 10a, 10b, 10c and 10d. The body 10 has a central bore 11 extending thereinto with a threaded enlargement 12 at one end terminating at a bounding face 10a, extending to a shoulder 13 and with an extension 14 of reduced diameter extending from an end face or wall 15.

A fluid connection 16 is provided, extending from the face 10b in intersecting relation to the bore extension 14 and can have a pipe 17 extending thereto. The fluid connection 16 and pipe 17 can serve for the supply of fluid to be controlled.

A fluid connection 18 is provided extending from the face 10d in intersecting relation to the bore 11 and can have a pipe 19 connected thereto. The connection 18 and pipe 19 can serve for fluid delivery.

Inserted within the bore 11 a valve seating sleeve 20 is provided having an outer cylindrical face 21 engaging the bore 11, an end face 22 engaging the end wall 15, and a central cylindrical longitudinal passageway 23 with an extension 24 of reduced diameter coaxially aligned therewith. A valve seat 25 is provided at the intersection of the passageway 23 and extension 24. The end face 22 has a groove 26 formed thereon substantially concentric with the extension 24 and communicating therewith. The groove 26 has a resilient and flexible packing ring 27 therein, such as an O-ring, which is compressed in part by its being confined by the groove 26 and end wall 15 to prevent fluid leakage coaxially outwardly along the end wall 15.

The sleeve 20 has a plurality of openings 28, and a peripheral groove 28a communicating therewith to establish communication between the passageway 23 and the fluid connection 18.

The sleeve 20 can be retained in place in any desired manner. In a specific embodiment a compressible hollow cylindrical packing ring 30 in the bore 11 and in engagement with a packing backer ring 30a is held by a gland 31 which in turn is held by a nut 32 having an outer threaded portion 33 engaging the threaded enlargement 12. It will be seen that the sleeve 20, backer ring 30a, packing ring 30, gland 31 and nut 32 are successively insertable within the bore 11, and all from the outer end thereof.

A valve stem 35 is provided, shown as extending through the gland 31 and backer ring 30a and packing ring 30. The stem 35 is of smaller diameter than the interior of the passageway 23 to provide ample clearance and reduce problems of concentricity.

The valve stem 35 can be actuated in any desired manner to move it along the passageway 23, and merely by way of illustration a threaded head 34 is shown from which the stem 35 extends, the head 34 being in threaded engagement with threads 36 in the interior of the nut 32, and having an actuating rod 37 extending outwardly beyond the nut 32.

The valve stem 35, for seating engagement with the valve seat 25, has a frusto-conical face 38. While this construction is satisfactory for many purposes, added advantages are obtained by providing an end extension 39, preferably with a slight taper of about one degree to four degrees, on the stem 35 to engage intermediate its ends with the packing ring 27. The tapered extension 39 permits of a metered flow and the engagement exerts an outward force on the ring 27 forcing it into the groove and provides a further fluid tight seal between the ring 27 and the extension 39 at this location. This seal in and of itself can shut off fluid flow and with a range of movement of the stem 35 during such shut off. The extension 39 can have a tapered end 40 to facilitate the entry into the ring 27.

It will be noted that the valve seating sleeve 20 is readily insertable into the central bore 11 with its end face 22 engaging the end wall 15. The groove 26 with the end wall 15 receives and retains the packing ring 27, holds it under compression and provide a seal at this location between the sleeve 20 and the lower end of the bore 11. The sleeve 20 is retained in position by the gland 31 which can be tightened to the desired extent.

With the stem 35 positioned so that the face 38 engages the seat 25 fluid flow will be shut off. Movement of the face 38 from the seat 25, if the extension 39 is not employed, will permit fluid to flow. If the extension 39 is used then separation of the extension 39 from its engagement with the ring 27 will also be required to permit fluid to flow.

With the stem 35 positioned so that the extension 39 of the stem 35 has its periphery engaged with the ring 27 fluid flow will also be cut off. Movement of the stem 35 to the desired extent will permit fluid to flow past the ring 27 to the passageway 23 and then through an opening 28 to the fluid connection 18 and the pipe 19.

We claim:

1. A high pressure valve for fluids comprising a body provided with a bore having a central portion of uniform diameter with an end wall and an extension of reduced diameter at one end thereof beyond said end wall, said central portion having an enlargement at the other end thereof terminating at a face of said body, a first fluid connection communicating with said bore extension and a second fluid connection in intersecting relation to said central portion, a valve seating sleeve in said central portion and having an inner end wall with a face engaging said end wall, said inner end wall having a metallic valve seat at a fixed location with an opening extending therefrom in communication with said bore extension members for retaining said sleeve in position, said inner end wall face having a groove surrounding said inner end wall opening, a packing in said groove in engagement with said sleeve inner end wall and said bore end wall, and a valve stem having a portion extending into said sleeve and having a metallic seating portion for engagement with said valve seat and providing a secondary shut-off, said stem having an extension with a peripheral part for engagement with said packing for primary cutting off of fluid flow.

2. A high pressure valve as defined in claim 1 in which said members for retaining said sleeve in position include packing members in engagement with said sleeve, a gland in engagement with said packing members, and a nut in threaded engagement in said enlargement, said valve stem extending through said gland and said nut.

3. A high pressure valve as defined in claim 1 in which said peripheral part for engagement with said packing is tapered.

References Cited by the Examiner

UNITED STATES PATENTS

| | | | |
|---|---|---|---|
| 2,638,108 | 5/1953 | Williams | 137—102 |
| 2,924,421 | 2/1960 | Pohndorf | 251—210 |
| 2,994,343 | 8/1961 | Banks | 251—210 X |
| 3,071,344 | 1/1963 | Banks | 251—210 |
| 3,145,010 | 8/1964 | Karr | 251—210 |

FOREIGN PATENTS

| | | |
|---|---|---|
| 648,750 | 9/1962 | Canada. |
| 170,809 | 3/1960 | Sweden. |

M. CARY NELSON, *Primary Examiner.*

ISADOR WEIL, *Examiner.*